US009268203B1

(12) United States Patent
List

(10) Patent No.: US 9,268,203 B1
(45) Date of Patent: Feb. 23, 2016

(54) MAGNETICALLY COUPLING A SYSTEM TO A SURFACE

(75) Inventor: Timothy T. List, Santa Cruz, CA (US)

(73) Assignee: Amazon Technologies, Inc., Seattle, WA (US)

(*) Notice: Subject to any disclaimer, the term of this patent is extended or adjusted under 35 U.S.C. 154(b) by 545 days.

(21) Appl. No.: 13/486,764

(22) Filed: Jun. 1, 2012

(51) Int. Cl.
*A47G 1/17* (2006.01)
*G03B 21/14* (2006.01)

(52) U.S. Cl.
CPC . *G03B 21/14* (2013.01); *A47G 1/17* (2013.01)

(58) Field of Classification Search
CPC ........ A47G 1/17; G03B 21/14; F21V 21/096; F16M 2200/025; F16M 2200/028; F16B 2001/0035; F16B 47/00
USPC .......... 353/46, 119, 122, 69; 248/683, 206.5, 248/343, 323; 446/133, 134, 135, 136; 180/167, 168, 169
See application file for complete search history.

(56) References Cited

U.S. PATENT DOCUMENTS

| 4,963,809 | A | * | 10/1990 | Shingu et al. ................. 318/696 |
| 5,581,944 | A | * | 12/1996 | Kornbrekke et al. ............. 49/28 |
| 6,345,105 | B1 | * | 2/2002 | Nitta et al. ..................... 382/100 |
| 7,758,001 | B2 | * | 7/2010 | Bouissiere ................. 248/206.5 |
| 2005/0128437 | A1 | * | 6/2005 | Pingali et al. .................. 353/69 |
| 2008/0088801 | A1 | * | 4/2008 | Miyazaki ........................ 353/33 |

OTHER PUBLICATIONS

Pinhanez, "The Everywhere Displays Projector: A Device to Create Ubiquitous Graphical Interfaces", IBM Thomas Watson Research Center, Ubicomp 2001, 18 pages.

* cited by examiner

*Primary Examiner* — William C Dowling
*Assistant Examiner* — Ryan Howard
(74) *Attorney, Agent, or Firm* — Lee & Hayes, PLLC

(57) ABSTRACT

A system may magnetically attach to a surface, such as a ceiling, wall, table, or other surface within an environment. For instance, a ceiling within an environment may include a magnet and a housing of the system may comprise a ferromagnetic material. Therefore, the system may magnetically couple to the ceiling for use. The system may be configured to move across the surface while remaining magnetically coupled to the surface.

24 Claims, 5 Drawing Sheets

MAGNETICALLY COUPLING A SYSTEM TO A SURFACE

BACKGROUND

Characterizing a scene within an environment and interacting with users within that environment may be aided by various types of components, such as cameras, microphones, projectors, speakers, sensors, transducers, lights, indicators, actuators, haptic devices, and so forth. However, use of these components within the environment requires careful consideration of how and where to place these components or systems that include multiple different combinations of these components.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
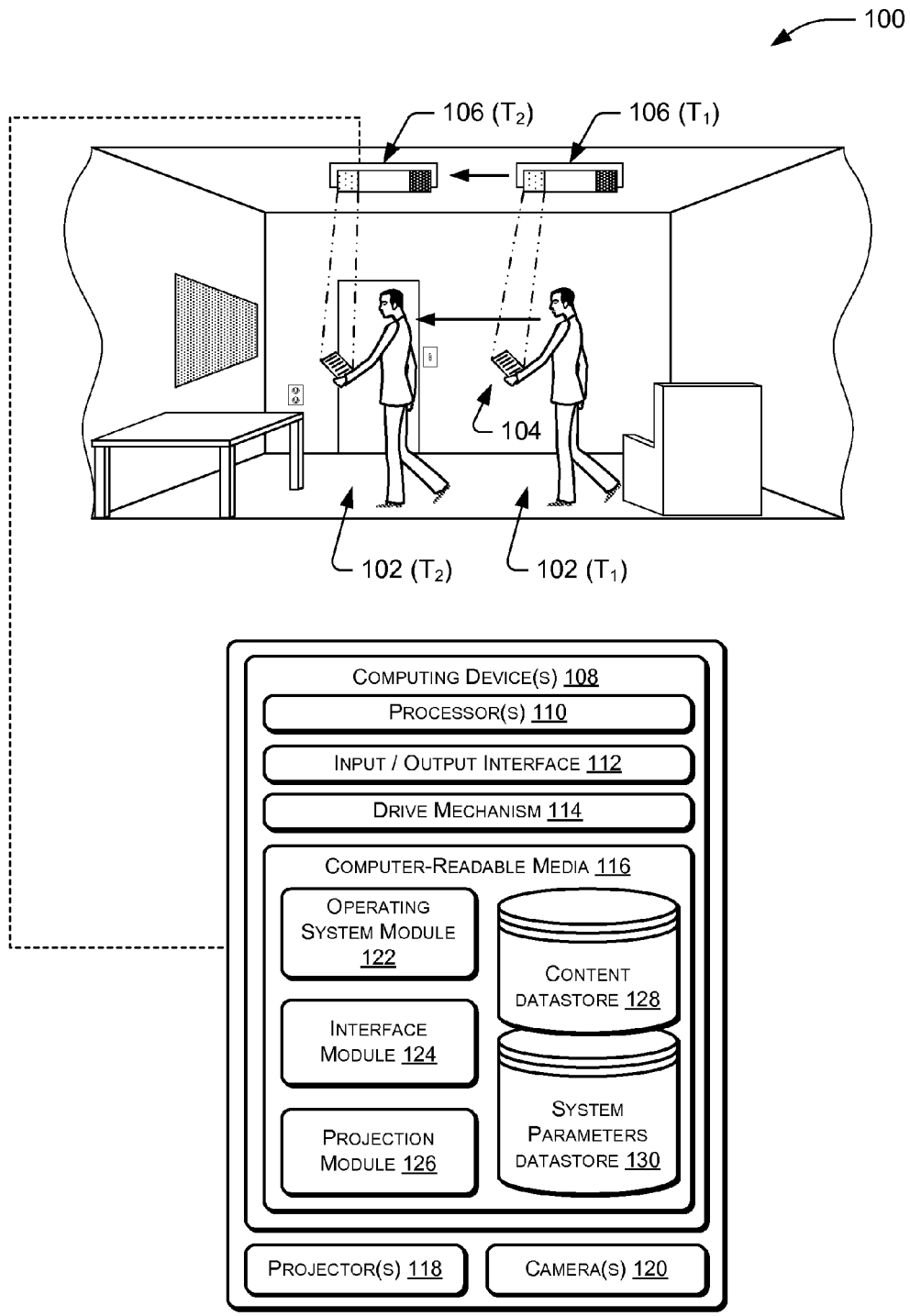
FIG. 1 shows an illustrative environment that includes an augmented reality functional node (ARFN) that magnetically couples to a ceiling within the environment and projects content onto a display medium held by a user. In addition, the ARFN is able to move across the ceiling in response to the user moving through the environment.

As described above, various components may be used to characterize an environment such as a room, or to respond to events and conditions within the environment. In some situations, it may be desired to evaluate physical characteristics of the environment, such as the shapes of surfaces and/or objects within the environment. It may also be desired to monitor sound within the scene, and to recognize and respond to different sounds such as speech. Generally, systems such as this may detect and monitor a large number of different events and conditions, including but not limited to:

User identities, positions, gestures, actions, and utterances;
Identities, characteristics, and positions of various objects and sounds;
Interactions and relationships between users and objects; and
Ambient conditions such as background noise, temperature, brightness, and humidity.

A system such as described herein may respond to events and conditions in various ways, depending on the capabilities and objectives of the system. For example, certain embodiments may be designed primarily to present visual content to a user, such as by projecting images onto a wall or other surface. Other embodiments may be designed to present other types of media such as audio, or to control environmental conditions such as temperature. Some embodiments may be designed to control various other systems within or affecting the environment, such entertainment systems, lighting systems, gaming systems, and so forth.

These actions may be performed automatically, in response to monitored conditions, and/or in response to explicit user commands. In this type of environment, users may give commands by speaking, by gesturing or motioning, by assuming certain positions or touching certain surfaces, by interacting with projected content, by "touching" projected content or "dragging" elements of the content, by uttering sounds or phrases, by physical manipulation of a control element such as a button, keypad, mouse, or joystick, and so forth.

In some embodiments, a system such as this may additionally be capable of recognizing various objects within a room, selecting surfaces upon which visual content may be projected, responding intelligently to user commands, and so forth. In general, varying degrees of intelligence and capabilities may be provided by such a system, depending on available interface technologies and computational power.

In order to provide general interface functionality of this nature, different components may be utilized within a room or other environment. Such components may include, but are not limited to:

Projectors for projecting visual content onto surfaces within the environment and for projecting non-visible patterns or images onto the scene to facilitate three-dimensional (3D) analysis;
Cameras for capturing images of the environment and/or or objects within the environment, and for capturing images of non-visible patterns to facilitate 3D analysis of the environment;
Microphones for capturing and recognizing sounds, and for identifying the sources of sounds and their positions;
Speakers for producing audio;
Depth sensors and range finders for detecting 3D characteristics of a scene;
Haptic devices and mechanical control elements such as buttons and lights for user interaction; and
Various other sensors and transducers that may be useful in a given environment for interacting with users, systems, and equipment relevant to the environment.

In certain embodiments described herein, such elements and functionality may be distributed throughout a room or environment, with different and/or overlapping functionality being provided at different locations. For instance, one or more different housings may contain one or more different components. Each of these housings with one or more components may be termed an "augmented reality functional node" (or "ARFN") in some instances. These ARFNs may then be distributed throughout the environment. For example, one ARFN may be set upon a table or the ground, another may be mounted to a wall, and another mounted to the ceiling.

In some instances, an ARFN may magnetically attach to a surface, such as a ceiling, wall, table, or other surface. For instance, a ceiling within an environment may include a magnet and a housing of the ARFN may comprise a ferromagnetic material. Therefore, the ARFN may magnetically couple to the ceiling for use. In some instances, meanwhile, the housing of the ARFN may include a magnet and the ceiling (or other surface) may comprise a ferromagnetic material, thus creating the same magnetic force coupling the ARFN to the ceiling.

In some instances, the ceiling or other surface may be coated with a magnetic material (e.g., a magnetic paint) to which the housing of the ARFN couples. In other instances, a magnet may be mounted to the ceiling or surface. In still other instances, the ceiling or other surface may be coated with ferromagnetic material (e.g., a ferromagnetic paint) or a solid piece of ferromagnetic material may be mounted to the ceiling or other surface.

In addition to mounting the ARFN to a surface magnetically, the ARFN may be configured to move relative to the surface while remaining magnetically coupled. In some instances, the ARFN or the surface may include functionality for imparting a force lessening the magnetic force to allow the ARFN to move in an x- or y-axis relative to the surface. As such, the ARFN and/or the surface may include a drive mechanism to both impart this force and subsequently move the ARFN across the surface while the ARFN remains magnetically coupled with the surface. In other instances, the ARFN may be configured to move without imparting a force to lessen the magnetic force between the ARFN and the surface.

In one example, the ARFN or the surface may include one or more electromagnets to impart the force that lessens the magnetic force (while still maintaining the magnetic coupling). The ARFN may also include one or more wheels that may be powered to move the ARFN in an x- or y-direction (or in any other direction) across the surface.

In another example, the surface may include a track system to the guide the ARFN across the surface. In this example, the drive mechanism of the ARFN may include an interface to secure the ARFN magnetically to the track. The track and the ARFN may each include one or more electromagnets that are alternately powered on or off for the purpose of pulling or pushing the ARFN along the track system.

In instances where the ARFN utilizes one or more electromagnets, the ARFN may receive power from a local or a remote power source. In one example, the ARFN may include a battery or other power supply for driving the electromagnet, the wheels, the components, and the like. In other instances, the surface may include a docking station at which the ARFN may dock to receive power. In still other instances, the ARFN may be "hard wired" to a power supply. In another example, electromagnetic resonant power transfer may be used to provide continuous power to the ARFN wirelessly. Of course, while a few examples have been listed, it is to be appreciated that the ARFN may receive power in any other number of ways.

FIG. 1 shows an illustrative environment 100 in which the described systems and techniques may be implemented. Similar functionality may also be provided in other environments.

The environment of FIG. 1 includes a user 102 at both a first time ($T_1$) and a second time ($T_2$). In each instance the user 102 is holding a display medium 104 onto which content is projected from an augmented reality functional node (ARFN) 106. In this example, the ARFN 106 includes both a projector to project content in the environment and a camera to image the environment. Of course, as discussed below, in other instances the ARFN 106 may include an array of different and/or additional components.

In the illustrated example, the ARFN 106 magnetically couples to a surface within the environment, in this case the ceiling. As discussed above, the ceiling may include a magnet or magnetic material and the ARFN 106 may include a housing made of a ferromagnetic material, or vice versa.

In the illustrated example, at $T_1$ the ARFN 106 projects content onto the display medium 104 of the user 102. This content may be any sort of content, such an electronic book, a video, a game, or the like. In addition, the ARFN 106 (or another ARFN within the environment 100) may detect the user moving through the environment. In response to detecting this movement, the ARFN 106 may generally move with the user 102 so that the ARFN is able to continue projecting the content onto the display medium without interference from the user or from other objects within the environment. As shown at $T_2$, the user has moved from the right side of the room to the left side of the room, and the ARFN 106 has moved similarly. In order to move in this manner, the ARFN 106 may include a drive mechanism that is able to move the ARFN 106 while the ARFN 106 remains magnetically coupled to the ceiling.

As illustrated, the ARFN 106 may include a computing device 108 having access to one or more processors 110, an input/output interface 112, a drive mechanism 114, and computer-readable media 116. The processors 110 may be configured to execute instructions, which may be stored in the computer-readable media 116 or in other computer-readable media accessible to the processors 110.

The input/output interface 112, meanwhile, may be configured to couple the computing device 108 to other components of the ARFN 106, such as a projector 118, a camera 120, microphones, other ARFNs 106, other computing devices, and so forth. The coupling between the computing device 108 and the devices may be via wire, fiber optic cable, wireless connection, or the like. Furthermore, while FIG. 1 illustrates the computing device 108 as residing within a housing of the ARFN 106, some or all of the components of the computing device 108 may reside at another location that is operatively connected to the ARFN 106.

The drive mechanism 114 may be configured to move the ARFN 106 across a surface to which the ARFN 106 is magnetically coupled. In one example illustrated in further detail below, the drive mechanism 114 may comprise an electromagnet to lessen the magnetic force between the ARFN and the surface. The drive mechanism 114 may also include one or more powered wheels or bearings to move the ARFN 106 across the surface in a desired direction. In other instances, the drive mechanism 114 may comprise an interface to a track system resident on the surface to which the ARFN 106 couples, also as described in further detail below.

The computer-readable media 116, meanwhile, may include non-transitory computer-readable storage media ("CRSM"). The CRSM may be any available physical media accessible by a computing device to implement the instructions stored thereon. CRSM may include, but is not limited to, random access memory ("RAM"), read-only memory ("ROM"), electrically erasable programmable read-only memory ("EEPROM"), flash memory or other memory technology, compact disk read-only memory ("CD-ROM"), digital versatile disks ("DVD") or other optical disk storage, magnetic cassettes, magnetic tape, magnetic disk storage or other magnetic storage devices, or any other medium which can be used to store the desired information and which can be accessed by a computing device 108. The computer-readable media 116 may reside within a housing of the ARFN, on one or more storage devices accessible on a local network, on cloud storage accessible via a wide area network, or in any other accessible location.

The computer-readable media 116 may store several modules, such as instructions, datastores, and so forth that are configured to execute on the processors 110. For instance, the computer-readable media 116 may store an operating system module 122, an interface module 124, a projection module 126, a content datastore 128, and a system parameters datastore 130.

The operating system module 122 may be configured to manage hardware and services within and coupled to the computing device 108 for the benefit of other modules. The interface module 124, meanwhile, may be configured to receive and interpret commands received from users within the environment 100. For instance, the interface module 124 may analyze and parse images captured by the camera 120 to identify gestures made by users within the environment 100. In response to identifying a predefined gesture, the interface module 124 may interpret the gesture and cause the ARFN 106 to perform a corresponding action, such as project certain content, move along the surface of the ceiling, or the like. In the illustrated example, the interface module may identify the user walking throughout the environment 100 and may instruct the drive mechanism 114 to move the ARFN 106 accordingly.

The content datastore 128, meanwhile, stores content for outputting within the environment. For instance, the content datastore may store applications and data for use within the environment 100. The projection module 126 may access the content datastore 128 in order to project requested content within the environment 100. For instance, when the user requests that the ARFN 106 project a particular electronic book, the projection module 126 may access the content datastore 128 to retrieve and cause projection of the desired electronic book.

Finally, the computer-readable media 116 may store the system parameters datastore 130, which is configured to maintain information about the state of the computing device 108, the projector 118, the camera 120, and so forth. For example, the ARFN 106 may be configured to move across the surface to which it attaches, and may also be configured to pan and tilt for the purpose of allowing the projector 118 and the camera 120 to access different projection surfaces in the environment 100. As such, the system parameters maintained in the datastore 130 may store an indication of a current location of the ARFN 106, pan, and tilt settings of the camera and projector, an indication of content that the ARFN 106 is currently projecting or otherwise outputting, and the like.

Figure 2:
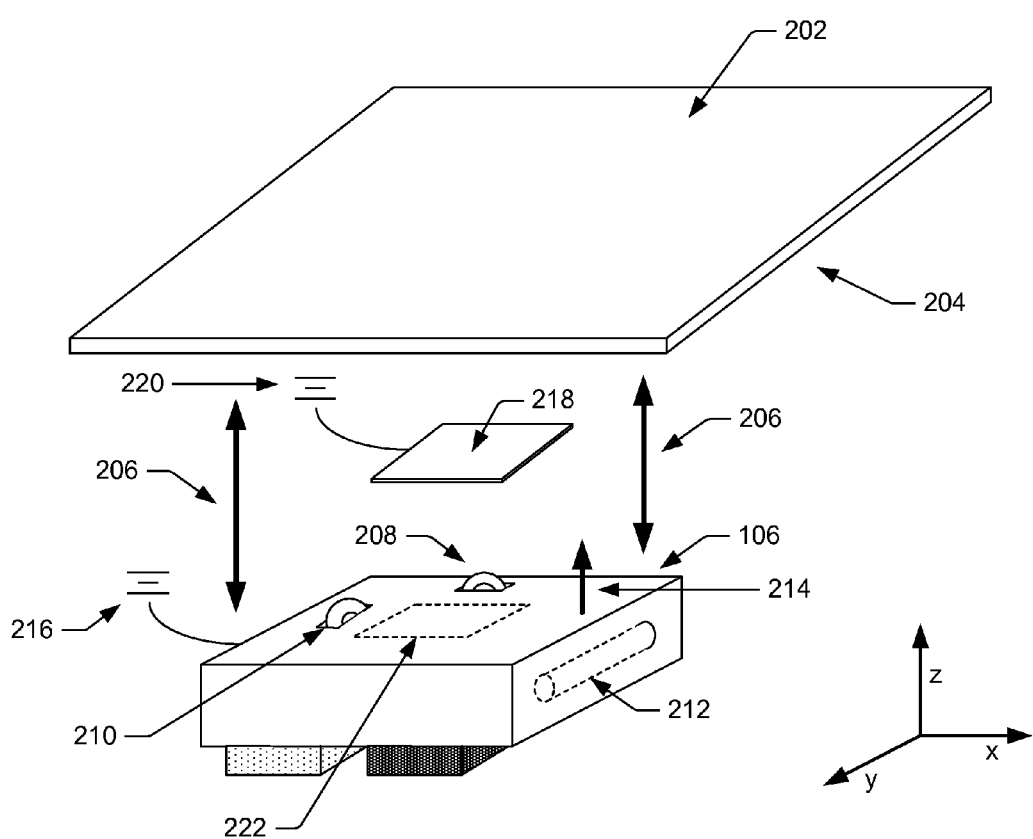
FIG. 2 shows an example of an ARFN that magnetically couples to a surface, such as a ceiling or wall. In this example, the ARFN includes wheels for moving the ARFN across the surface in an x- or y-axis.

FIG. 2 shows an example of an ARFN 106 that magnetically couples to a surface 202, such as a ceiling or wall. In this example, the surface 202 may include either a magnet 204 on a bottom side of the surface or may be coated on the bottom side with a magnetic material 204 (e.g., magnetic paint). In this example, the housing of the ARFN 106 may include a ferromagnetic material that attracts to the magnet or magnetic material 204, as illustrated by arrows 206. In another embodiment, the surface 202 may include a ferromagnetic material and the housing of the ARFN 106 may include a magnet or magnetic material.

In addition, the ARFN 106 includes a wheel 208 to move the ARFN 106 in the x direction and a wheel 210 to move the ARFN 106 in the y direction. While this example illustrates two wheels, other embodiments may utilize any other number of wheels or drive mechanisms (e.g., bearings, roller balls, etc.). The ARFN 106 is also shown to include an electromagnet 212. The electromagnet may be powered on to create a force 214 opposite the surface 202, thereby loosening the magnetic coupling between the ARFN 106 and the surface while still ensuring that the ARFN 106 remains attached to the surface. After the electromagnet 212 creates the force 214, the ARFN 106 may power one of the wheels 208 and 210 to move the ARFN 106 across the bottom side of the surface 202.

In some instances, the ARFN 106 either includes or directly couples to a power source 216 for driving the drive mechanism, the electromagnet, and/or other components of the ARFN 106. For instance, the ARFN 106 may include a battery or other internal power supply, or may hard wire to a power supply. In another example, the surface 202 may include a docket station 218 that couples to a power source 220. In this example, the ARFN 106 may include an interface 222 for aligning with the docking station 218 and powering a battery or other rechargeable power supply in the ARFN 106. In yet another example, electromagnetic resonant power transfer may be used to provide continuous power to the ARFN 106 wirelessly.

Figure 3:
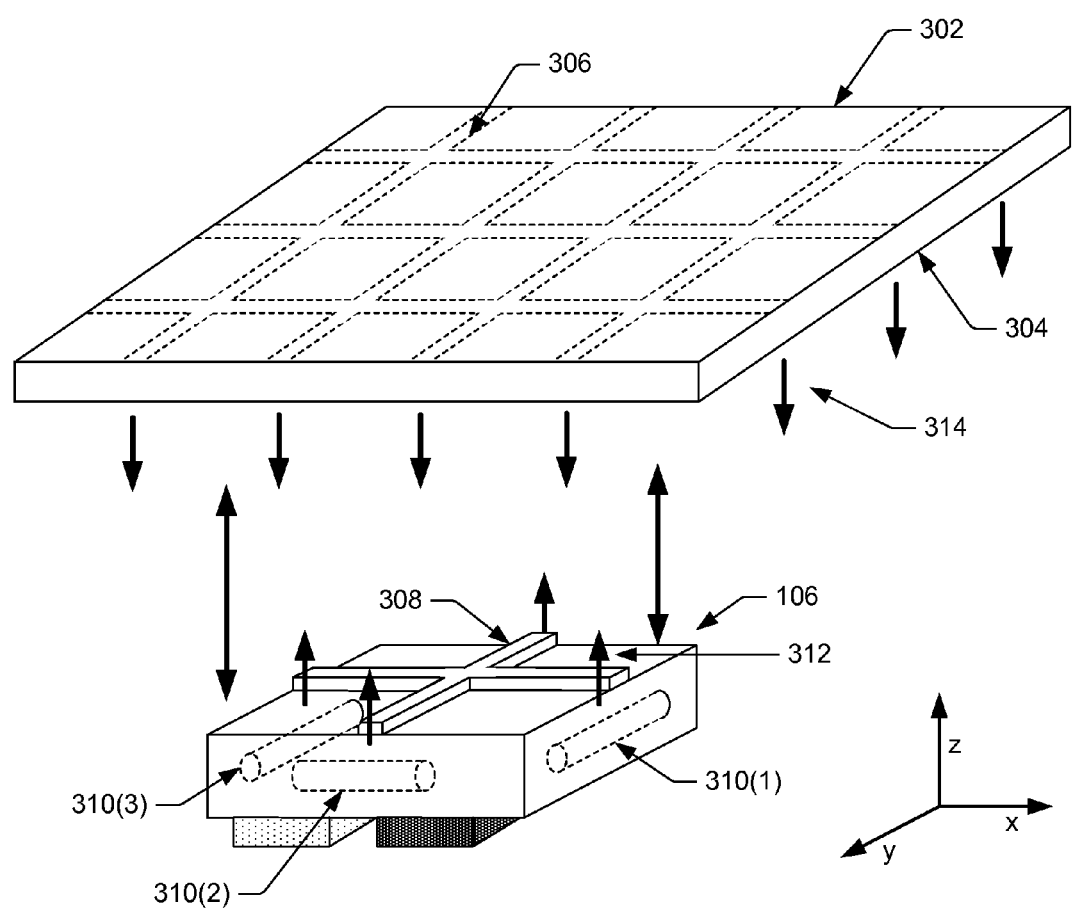
FIG. 3 shows an example of an ARFN that magnetically couples to a surface, such as a ceiling or wall. In this example, the surface includes a track system and the ARFN includes an interface for the track system for moving the ARFN across the surface in the x- or y-axis.

FIG. 3 shows another example of an ARFN 106 that magnetically couples to a surface 302, such as a ceiling or wall. In this example, the surface 302 again includes a magnetic material 304 for magnetically coupling with the ARFN 106. In addition, the surface includes a track system 306 on the bottom of the surface for attaching to an interface 308 of the ARFN 106. Using the track system 306, the ARFN 106 may move across the bottom side of the surface 302 in the x- or y-axis in this example.

Also as illustrated, the ARFN 106 may include several electromagnets 310(1), 310(2), and 310(3), as may the track system 306 (not illustrated). When the ARFN 106 magnetically couples to the surface 302, the electromagnets in the ARFN 106 and the electromagnets in the track system may alternately power on and off in order to effectively pull the ARFN 106 along the track 306 in the desired direction. For instance, the electromagnet 310(1) may create a force 312, followed by a force 314 created by an electromagnet coupled to the track 306, and so forth, thus moving the ARFN 106 along the bottom side of the surface 302 in the desired direction.

Figure 4:
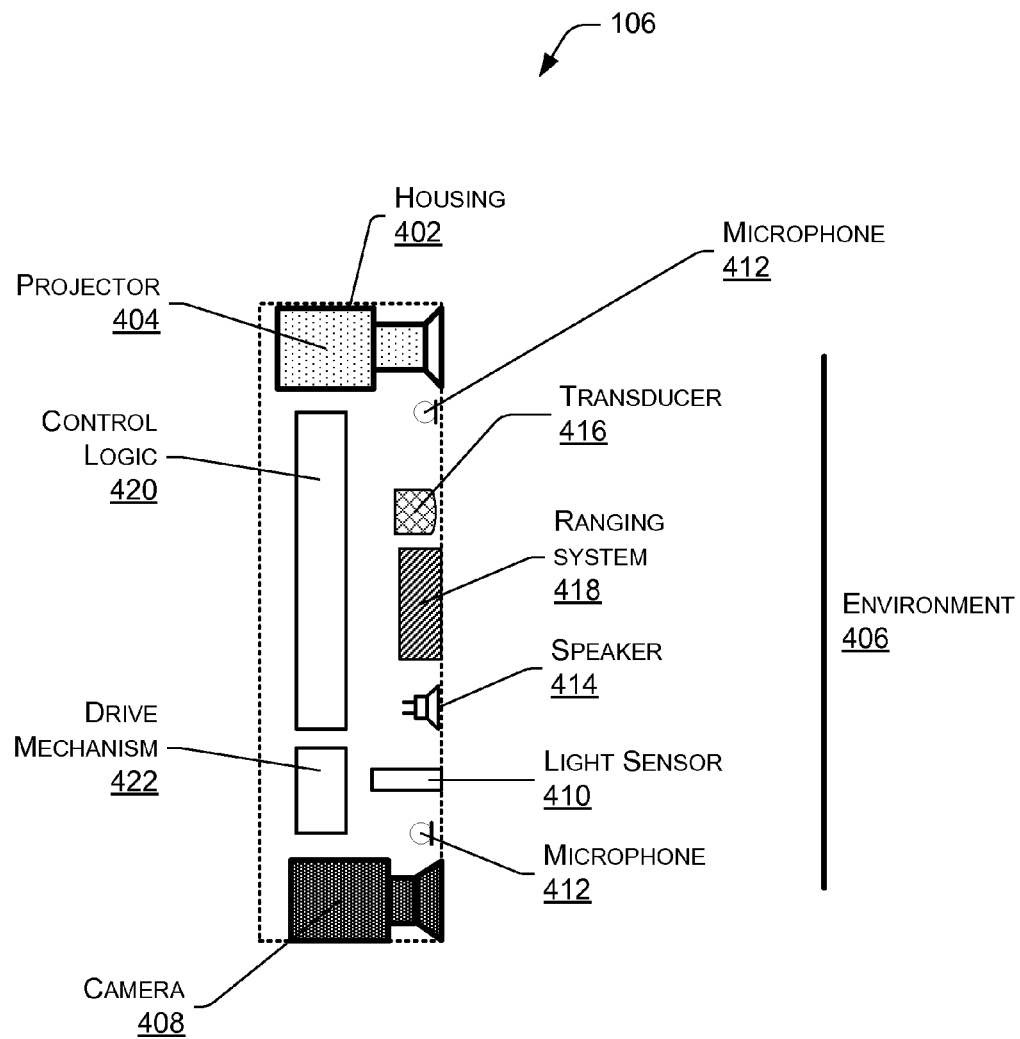
FIG. 4 shows example components of an ARFN.

FIG. 4 shows an example of a physical configuration of an ARFN 106. A housing 402 holds the components of the ARFN 106. As described above, the housing may comprise a ferromagnetic material or a magnetic material in some instances. Within the housing 402 may be disposed a projector 404 that generates and projects images onto surfaces within the environment 406. These images may be visible light images perceptible to a user, non-visible light images imperceptible to users, or combinations thereof. The projector 404 may be implemented with any number of technologies capable of generating an image and projecting that image onto a surface within the environment. Suitable technologies include a digital micromirror device (DMD), liquid crystal on silicon display (LCOS), liquid crystal display, 3LCD, and so forth. In some implementations, a plurality of projectors 404 may be used.

A camera 408 may also be disposed within the housing 402. The camera 408 may be configured to capture images of the environment 406 in visible light wavelengths, non-visible light wavelengths, or both. The field of view of the camera 408 may be variable. For example, an optical zoom of the camera may widen or narrow the camera field of view. In some implementations a plurality of cameras 408 may be used.

In some embodiments, the ARFN 106 may also have a directional light sensor 410. The light sensor 410 may sense reflected light from an area that has been illuminated by the projector 404. The light sensor 410 in some cases may have a field of view that is smaller than that of the projector 404. Furthermore, depending on implementations details, it may have a variable field of view.

The projector 404, camera 408, and directional light sensor 410 may be mounted with fixed orientations or may have variable orientations controlled by actuators such as piezoelectric actuators, motors, linear actuators, and so forth. Projection and viewing angles of the projector 404, camera 408, and directional light sensor 410 may alternatively be controlled by digital or electronic means.

One or more microphones 412 may be disposed within the housing 402. These microphones 412 may be used to acquire input from the user, for echolocation, location determination of a sound, or to otherwise aid in the characterization and receipt of input from the environment 406. Such microphones may provide for the detection of sound within the environment 406, and may also be used to calculate the positions of speakers or other sound sources within a room, by comparing audio signals from microphones located at different places within the environment.

In order to analyze shapes, the projector 404 may be configured to project a structured light pattern onto a surface or object within the environment. A camera 408 at an offset position relative to the projector 404 may then be used to capture the reflection of the structured light pattern. Distortions in the captured structured light pattern can be analyzed to determine contours of the surface or object, which can in turn be interpolated to represent the approximate three-dimensional shape of the surface or object. These techniques may also be used to effectively track a user through the environment, as illustrated in FIG. 1.

The structured light pattern may comprise non-visible light in some embodiments. For example, the structured light may be formed by infrared illumination. Such infrared illumination may be superimposed over a visible image that is projected for viewing or consumption by a user within the scene.

One or more speakers 414 may also be present to provide for audible output. For example, the speakers 414 may be used to provide output from a text-to-speech module or to playback pre-recorded audio.

A transducer 416 may be present within the ARFN 106, or elsewhere within the environment, and configured to detect and/or generate inaudible signals such as infrasound or ultrasound. These inaudible signals may be used to provide for signaling between accessory devices and the ARFN 106.

A ranging system 418 may also be provided in the ARFN 106. The ranging system 418 may be configured to provide distance information from the ARFN 106 to a scanned object or set of objects. The ranging system 418 may comprise radar, light detection and ranging (LIDAR), ultrasonic ranging, stereoscopic ranging, and so forth. In some implementations the transducer 416, the microphones 412, the speaker 414, or a combination thereof may be configured to use echolocation or echo-ranging to determine distance and spatial characteristics.

Control logic 420 may be located within the housing 402, and may comprise the processors 110, computer-readable media 116, and various executable modules as discussed with reference to FIG. 1. Finally, the ARFN 106 may include a drive mechanism 422 to move the ARFN 106 across a surface to which the ARFN 106 magnetically couples. As discussed above, the drive mechanism 422 may comprise one or more different components, such as wheels, bearings, electromagnets, and the like.

Figure 5:
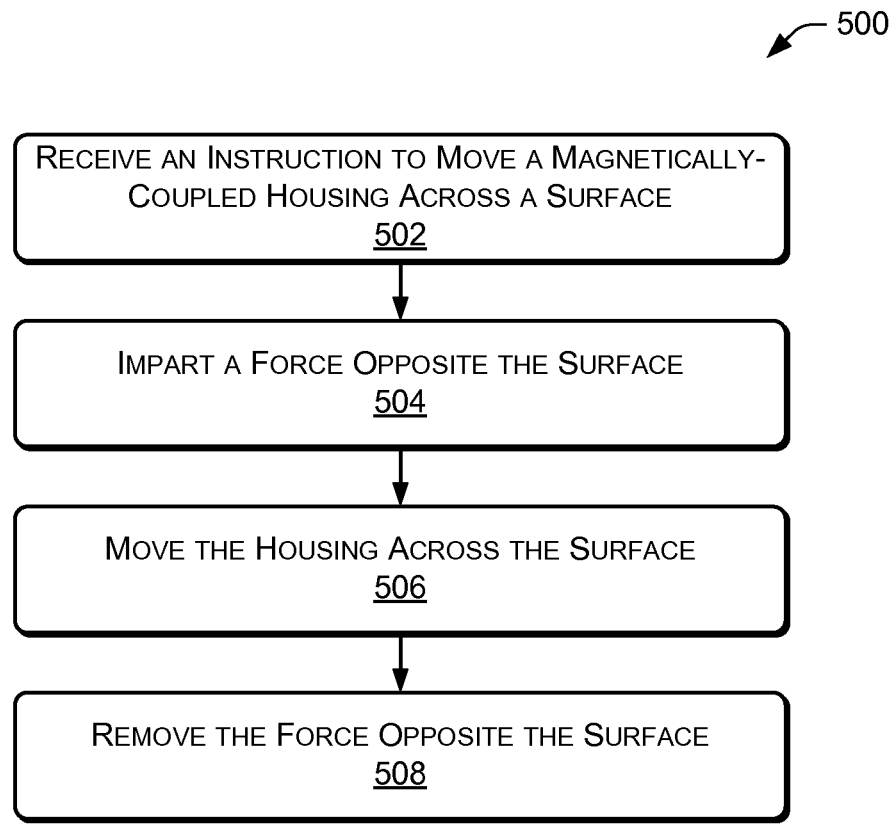
FIG. 5 shows a flow diagram of an example process for moving a system across a surface while a housing of the system remains magnetically coupled with the surface.

FIG. 5 shows a flow diagram of an example process 500 for moving a system across a surface while a housing of the system remains magnetically coupled with the surface. The process 500 may be implemented by the architectures described herein, or by other architectures. This process is illustrated as a collection of blocks in a logical flow graph. Some of the blocks represent operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order or in parallel to implement the process.

At 502, the process 500 receives an instruction to move the housing across a surface while the housing remains magnetically coupled to the surface. This instruction may be received from a user command (e.g., audible, gesture, etc.), in response to determining that a user is moving within an environment, or the like. At 504, the process 500 causes a force to be imparted opposite the surface. For instance, the system may include an electromagnet that, when powered on, creates a force that lessens the magnetic force between the surface and the housing. In other instances, the system may physically impart the force (e.g., via a bar that contacts the surface) or may impart the force in any other manner.

At 506, the process 500 instructs a drive mechanism of the system to move the housing across the surface while the force is imparted against the surface. Given the imparted force, the drive mechanism encounters less resistance when trying to move the housing. Finally, at 508, the process 500 causes the force opposite the surface to be removed. For instance, when the system reaches the desired destination, the process 500 may remove the force and thereby increase the magnetic force between the surface and the housing.

Note that the various techniques described above are assumed in the given examples to be implemented in the general context of computer-executable instructions or software, such as program modules, that are stored in computer-readable storage media and executed by the processor(s) of one or more computers or other devices such as those illustrated in the figures. Generally, program modules include routines, programs, objects, components, data structures, etc., and define operating logic for performing particular tasks or implement particular abstract data types.

Other architectures may be used to implement the described functionality, and are intended to be within the scope of this disclosure. Furthermore, although specific distributions of responsibilities are defined above for purposes of discussion, the various functions and responsibilities might be distributed and divided in different ways, depending on particular circumstances.

Similarly, software may be stored and distributed in various ways and using different means, and the particular software storage and execution configurations described above may be varied in many different ways. Thus, software implementing the techniques described above may be distributed on various types of computer-readable media, not limited to the forms of memory that are specifically described.

Furthermore, although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims

What is claimed is:

1. A system comprising:
   a housing configured to magnetically couple with a surface without another type of coupling;

a projector coupled to the housing and configured to project content within an environment;

a camera coupled to the housing and configured to image the environment; and a drive mechanism coupled to the housing and configured to move the system across the surface while the housing remains magnetically coupled with the surface.

2. A system as recited in claim 1, wherein the surface comprises at least one of a ceiling or a wall.

3. A system as recited in claim 1, wherein the surface comprises a ceiling having a magnet attached thereto, and wherein the housing comprises a ferromagnetic material.

4. A system as recited in claim 1, wherein the surface comprises a ceiling having a magnetic paint applied thereto, and wherein the housing comprises a ferromagnetic material.

5. A system as recited in claim 1, wherein the surface comprises a ceiling having a ferromagnetic material, and wherein the housing comprises a magnet.

6. A system as recited in claim 1, wherein the drive mechanism comprises a wheel for contacting the surface and facilitating movement of the system across the surface.

7. A system as recited in claim 1, further comprising control logic to receive a request to move the system across the surface and, in response, cause the drive mechanism to move the system across the surface.

8. A system as recited in claim 1, wherein the surface includes a magnet, and the drive mechanism comprises an electromagnet configured to create a force repelling the magnet, the force enabling the system to move across the surface.

9. A system as recited in claim 1, wherein the surface includes one or more tracks, and the drive mechanism comprises an interface for coupling the system to the one or more tracks and for facilitating movement of the system along the one or more tracks.

10. A system as recited in claim 1, further comprising control logic configured to:

cause the projector to project content within the environment;

determine, using images captured by the camera, that a user is moving within the environment; and cause the drive mechanism to move the system at least partly in response to determining the user moving within the environment.

11. A system as recited in claim 1, further comprising a microphone to receive input within the environment.

12. A system as recited in claim 1, further comprising a speaker to output content within the environment.

13. A system comprising:

a housing configured to magnetically couple with a ceiling within an environment, wherein the only coupling between the housing and the ceiling is magnetic coupling;

at least one of: a projector coupled to the housing and configured to project content in the environment, a camera coupled to the housing and configured to image the environment, or a speaker coupled to the housing and configured to output content within the environment; and a drive mechanism coupled to the housing and configured to move the system across the ceiling while the housing remains magnetically coupled with the ceiling.

14. A system as recited in claim 13, wherein the drive mechanism is configured to move the system in an x-axis and a y-axis relative to the ceiling.

15. A system as recited in claim 13, wherein the ceiling comprises a magnetic paint and the housing comprises a ferromagnetic material to magnetically couple with the ceiling.

16. A system as recited in claim 13, wherein the ceiling comprises a ferromagnetic material and the housing comprises a magnet to magnetically couple with the ceiling.

17. A system as recited in claim 13, wherein the ceiling includes a magnet, and the drive mechanism comprises:

an electromagnet configured create a force repelling the magnet; and one or more wheels or bearings for rolling along the ceiling when then electromagnetic creates the force repelling the magnet.

18. A system as recited in claim 13, further comprising a power source for powering the drive mechanism.

19. A system as recited in claim 13, wherein the system receives power for the drive mechanism from a power source that is remote from the housing.

20. One or more non-transitory computer-readable media storing computer-executable instructions that, when executed on one or more processors, cause the one or more processors to perform acts comprising:

at least one of capturing images of an environment by a camera in a housing or capturing sound from the environment by a microphone in the housing;

analyzing the at least one of the captured images or captured sound to determine a direction an object is moving within the environment;

receiving an instruction to move the housing across a surface at least partly in response to determining the direction the object is moving within the environment, the housing magnetically coupled to the surface;

causing a force to be imparted opposite the surface;

instructing a drive mechanism to move the housing across the surface while the force is imparted opposite the surface; and causing the force opposite the surface to be removed.

21. One or more non-transitory computer-readable media as recited in claim 20, wherein the surface comprises a ceiling or wall of the environment and the housing holds a projector to project content within the environment.

22. One or more non-transitory computer-readable media as recited in claim 20, wherein the surface comprises a ceiling or wall of the environment.

23. One or more non-transitory computer-readable media as recited in claim 20, wherein the surface includes a magnet, the housing includes an electromagnet, and the electromagnet imparts the force opposite the surface by repelling the magnet.

24. One or more non-transitory computer-readable media as recited in claim 20, wherein the housing includes one or more wheels or bearings to facilitate moving the housing across the surface.

* * * * *